United States Patent [19]

Ilk

[11] 4,185,419

[45] Jan. 29, 1980

[54] WORKING METHOD FOR THE AUTOMATIC BURSTING-OFF AND GRINDING THE EDGES OF GLASSES, AND AUTOMATIC MACHINE FOR CARRYING OUT SUCH METHOD

[76] Inventor: Emil Ilk, Ahornweg 4, 8372 Zwiesel, Fed. Rep. of Germany

[21] Appl. No.: 845,296

[22] Filed: Oct. 25, 1977

[30] Foreign Application Priority Data

Jan. 7, 1977 [DE] Fed. Rep. of Germany ....... 2700487

[51] Int. Cl.$^2$ ................................................ B24B 9/12
[52] U.S. Cl. .................... 51/5 R; 51/227 R; 51/283 E; 65/113
[58] Field of Search ............... 65/112, 113; 51/227 R, 51/5 R, 5 A–5 C, 283 E, 323, 326

[56] References Cited

U.S. PATENT DOCUMENTS

| | | | |
|---|---|---|---|
| 117,208 | 7/1871 | Richardson | 51/227 R |
| 3,436,865 | 4/1969 | Kalocsai | 51/227 R |
| 3,650,724 | 3/1972 | Lash | 65/113 |
| 3,927,873 | 12/1975 | Chambers | 51/227 R |

*Primary Examiner*—Harold D. Whitehead
*Attorney, Agent, or Firm*—Fitch, Even & Tabin

[57] ABSTRACT

The present invention relates to a working method for the automatic bursting-off and grinding of the edges of glasses, particularly automatically manufactured shaft or stemmed glasses as discharged from the glass blowing automaton upon attaching the stem including the base or foot, as well as an automatic machine for carrying out such method.

14 Claims, 10 Drawing Figures

WORKING METHOD FOR THE AUTOMATIC BURSTING-OFF AND GRINDING THE EDGES OF GLASSES, AND AUTOMATIC MACHINE FOR CARRYING OUT SUCH METHOD

Processing methods are known in which the cups of stemmed glasses are first marked or scribed, whereupon, after the burst-off of the excess of glass, the edge is edge trimmed by grinding and heating same. The term "burst off" refers to a cracking off of a portion of the molded article such as a portion about the lip of a cup-shaped glass article. However, it has been shown to be disadvantageous in these processes that the irregularities formed on the edge in the burst-off step cannot be equalized adequately, and that and that the edges are not finished uniformly especially in the case of greater wall thicknesses.

Accordingly, it is the object of the present invention to provide a working method for the automatic machining or processing of the edges of cup-shaped glasses, which method allows to obtain absolute uniformity of the edge of each glass regardless of the wall thickness of the glass, said method, further, providing for improved quality as compared to the purely manual manufacture, whereby not only the edge should be shaped with absolute uniformity (consistency), but also the height of the finished glasses should be absolutely identical among themselves.

Additionally, the automatic manufacturing machine for carrying out such method should be economical to construct, adapted to operate in trouble-free and operationally safe manner, and render unnecessary the services of qualified or experienced operators. Furthermore, the machine sholud be capable of operating with minimum wear of the components subject to wear, such as grinding wheels and the like, and operation should be possible to be performed with minimum setting periods. In particular, continuous operation without trouble should be possible over extended periods of time.

According to the present invention, these objects are solved by a working method comprising the following method steps:

(1) Marking or scribing of the edge or rim;
(2) heating and bursting-off of the edge;
(3) pre-grinding the edge in three steps;
(4) internal and external trimming of the edge;
(5) precision grinding or finishing of the edge; and
(6) polishing of the edge in two steps.

For additional labor saving, following the edge finishing operation the glasses are automatically washed and dried, such that the glasses may be placed into the shipping packing in a manner to prevent breakage of glasses from occuring.

As far as the apparatus is concerned, the object of the present invention is solved by a processing rotary platen comprising a rotatable turret for conveying said glasses between the stations of a stationary table, with said cup-shaped glasses being suspended with their feet or bases in the peripheral portion of said turret with the cups thereof directed downwards, said stationary table carrying the machining or processing tools in the peripheral portion thereof and being adapted to be raised and lowered; a pair of identical processing stations each, disposed in side-by-side relation and serving to process a pair of likewise side-by-side positioned glasses of the same processing stage; and a Geneva wheel-type transmission for advancing the glasses suspending turret by the pitch of a pair of processing positions each.

In order to provide for continuous operation of the diamond points which are rapidly worn in the marking process, the marking stations may be provided with a plurality of diamond pins or styluses combined into a rotatable unit, which pins are adapted to be successively swung against the periphery of the glasses to be marked in the fashion of a machining turret.

For the absolutely uniform or consistent machining of the already ground edge, the automatic machine according to the invention preferably includes edge trimming stations provided with diamond grinding wheels engaging the edge of the cup, and a conical or cylindrical hold-up element, said components being disposed on opposite sides of the edge or having the edge of the glass positioned between them, respectively.

In order to obviate the necessity for the extremely rapidly wearing grinding or polishing belts for polishing the edges of the glasses, the automatic machine according to the inventions is preferably further characterized by polishing stations comprising a pair or contrarotating grinding wheels formed of sandstone and adapted to be vertically pressed against said edge.

For the final processing of the glasses after the grinding operation, the automatic machine according to the invention further includes a subsequently positioned washing and drying station for said glasses, with said drying station comprising a rotating endless belt of a highly absorbent material upon which the glasses are placed with the top edge directed downwards and which is continuously dried by being squeezed out between a pair of rollers.

It is surprising to the expert that the method according to the invention allows to obtain a quality not only equal to, but even better than the quality of manually ground glasses. Since breakage of glasses is avoided and the services of highly trained operators are no longer required, the solution according to the invention, thus, provides a substantial technical advance.

Below, an exemplary embodiment of the invention is explained in greater detail by referring to the accompanying drawings, wherein.

Figure 1:
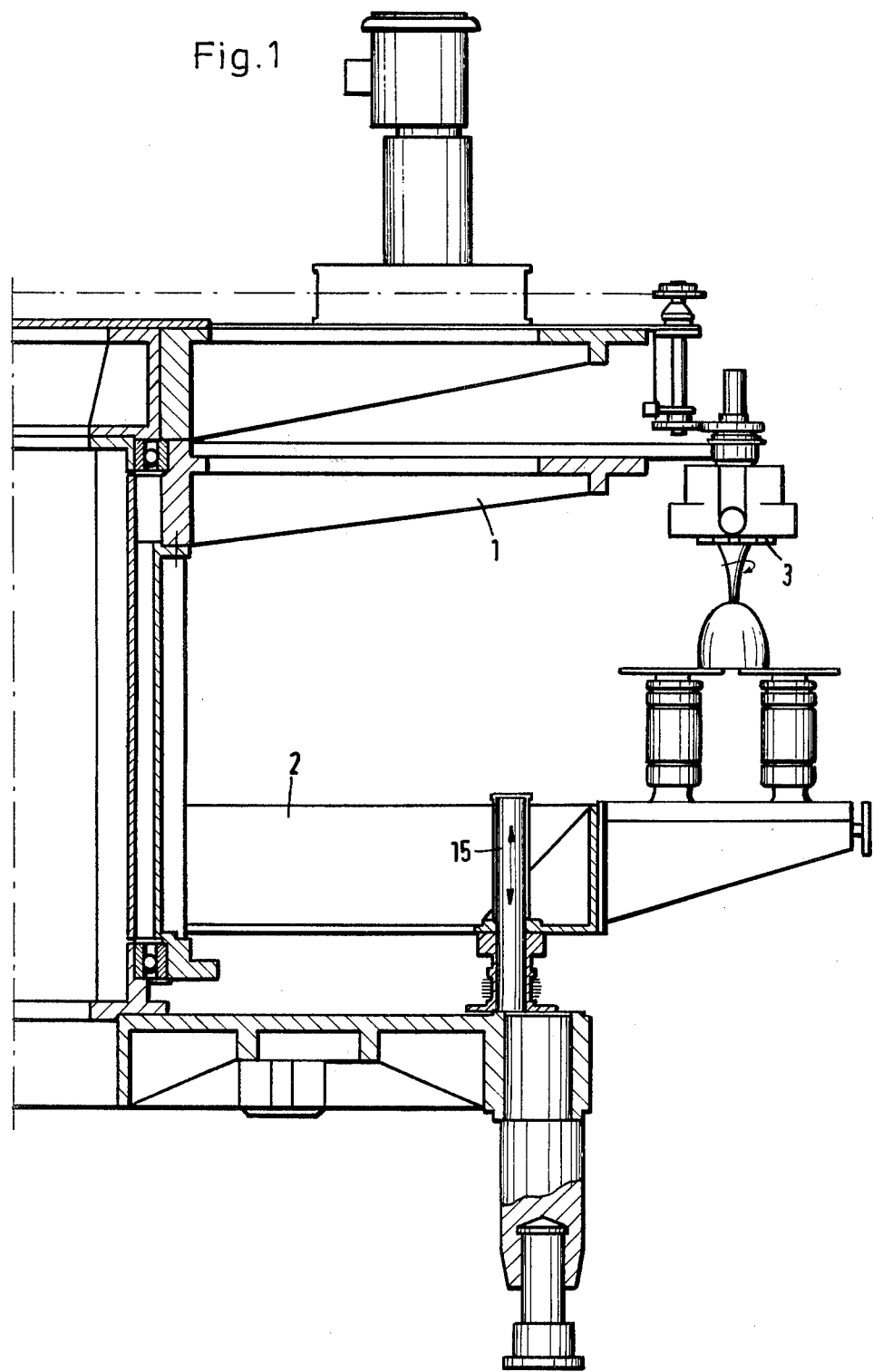
FIG. 1 shows in sectional view one half of the basic structure of a burst-off and grinding station.

As illustrated in the drawings, the automatic machine according to the invention comprises a rotatable turret 1 in the peripheral portion of which the glasses are suspended with their feet or bases, with the holders 4 for the glasses being driven for rotation by suitable means. Below the rotatable turret, a stationary table is provided the peripheral portion of which supports the machining and finishing tools which, in turn, are adapted to be raised and lowered by lifting cylinders 15.

Figure 10:
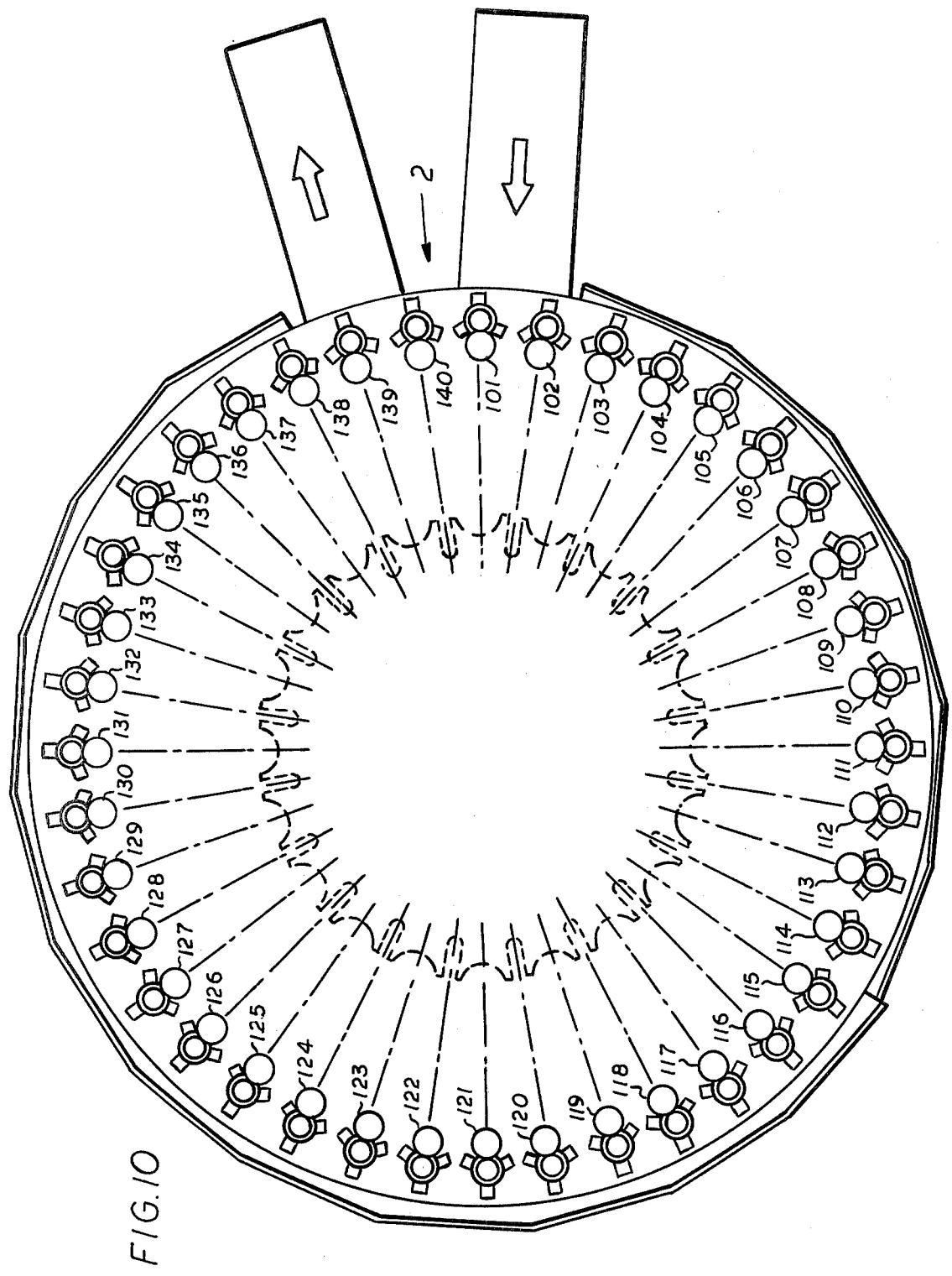
FIG. 10 shows the table and various stations thereon, as illustrated in the above figures.

The stationary table 2 has a pair of finishing stations of the same type arranged in side-by-side relation each. As will be explained hereinafter in connection with FIG. 10, the illustrated table 2 has forty stations 101–140 with each pair of adjacent stations, e.g., stations 101 and 102 having the same operation being performed thereat. Following an machining or finishing operation, table 2 is lowered, table 1 is rotated by the pitch of two finishing stations, and after the table 2 has been raised, the finishing tools are again brought into contact with the edge of the glass so as to perform another processing step, namely the respective next finishing step. Thus, rotation of the table through twenty increments will complete one revolution of the table with each glass having experienced twenty operations during the course of the revolution.

At the end of the finishing stations, a withdrawal or discharge station 139 or 140 (FIG. 10) is provided in which the glasses are removed from the respective holder 3, and in a subsequent station, i.e. the first station 101 or 102 of the processing line, untreated new glasses are placed into the holders, which glasses have their cups still closed in the state as blown.

Figure 2:
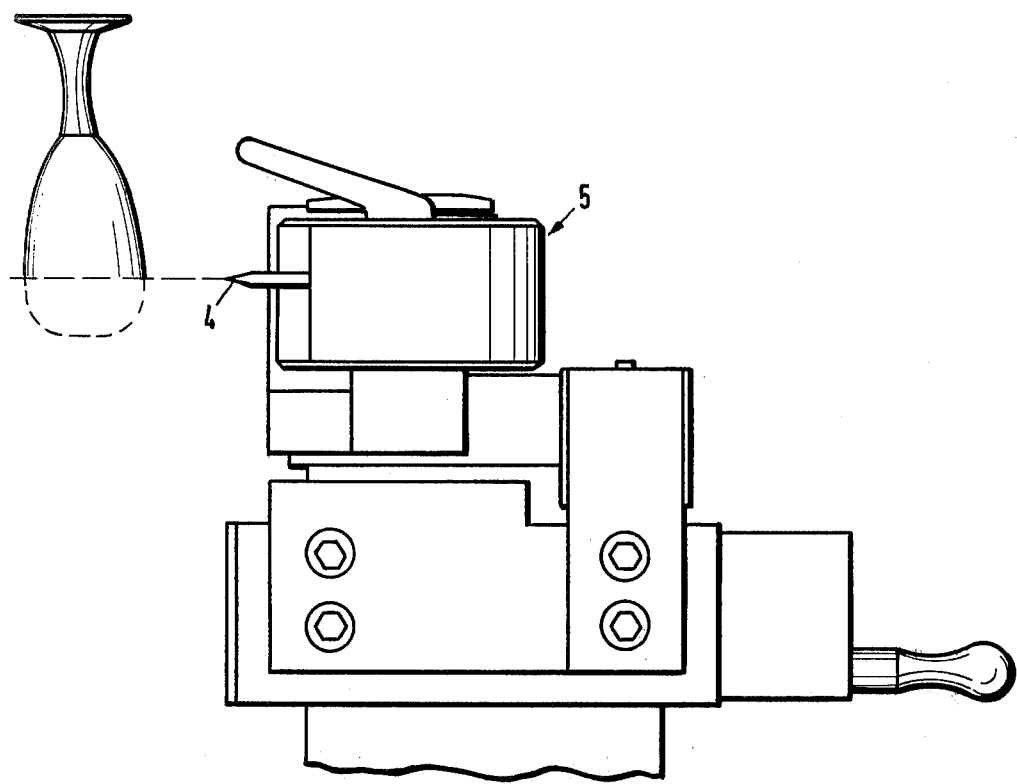
FIG. 2 is a side elevational view of the marking or scribing station.

In a marking (scribing) station 103 or 104, a diamond point 4 (FIG. 2) is pressed against the periphery of the rotating glass so as to produce a thin scratch line which permits to provide a substantially smooth edge or rim in the subsequent burst-off station by heating at a flame station 105 or 106 and beating against the cup portion to be removed at stations 107, 108; 109, 110; or 111, 112. Three diamond points 4 each are mounted in a pivotable holder 5, and these diamond points may be swung into the working position in succession, either automatically or by manual operation. In this manner, the rapidly wearing diamond points may be employed without the necessity of periodically stopping the operation for replacement of the diamond tips.

Upon burst-off of the edge, the glass is advanced to three successively arranged grinding stations 115, 116; 117, 118 and 119, 120 including grinding wheels 6 which are pressed against the edge. The three successive grinding stations each employ diamond grinding wheels of decreasing grain size. In this construction, the grinding wheels 8 are mounted for rotation directly on the shafts of motors 9.

Figure 3:
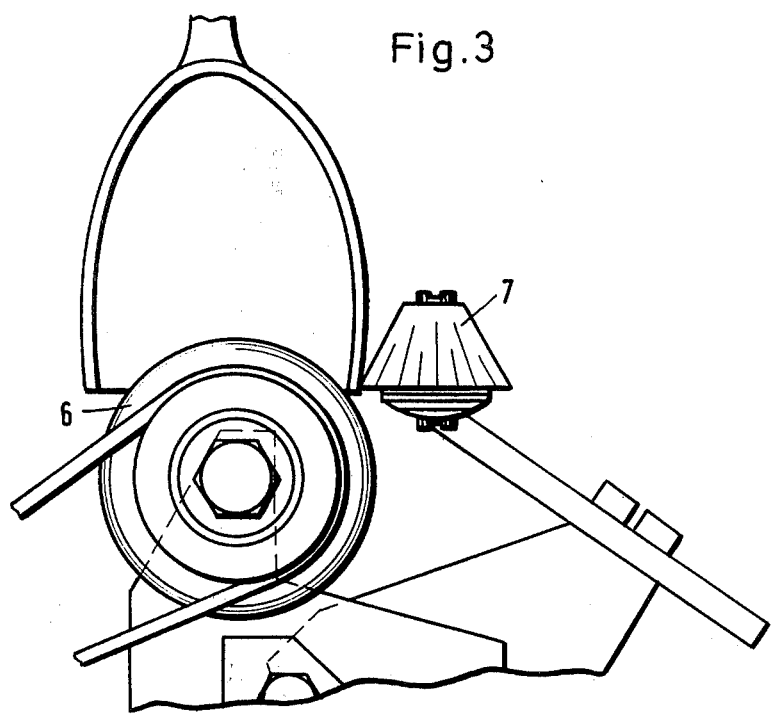
FIG. 3 is a side elevational view of the internal edge trimming station.
Figure 4:
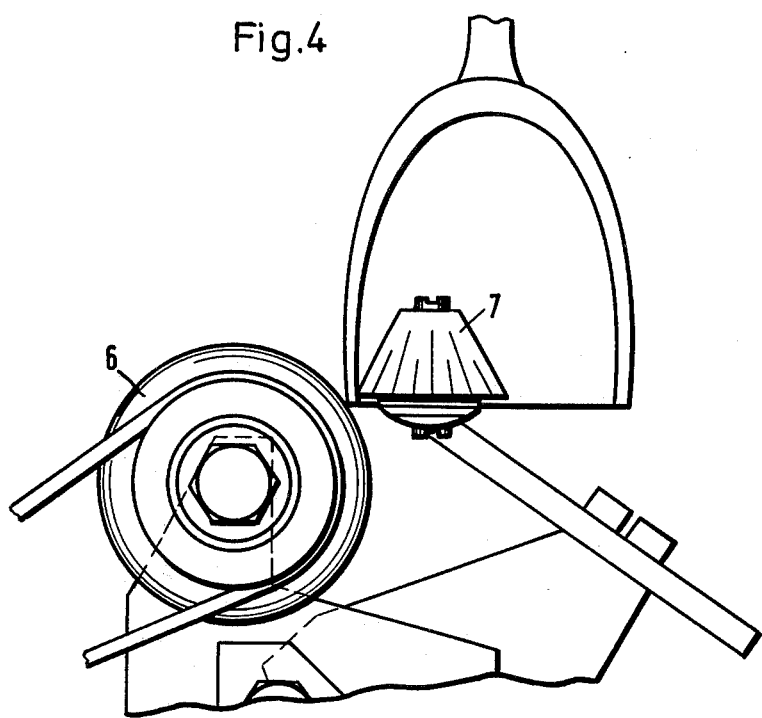
FIG. 4 is a side elevational view of the external edge trimming station.
Figure 5:
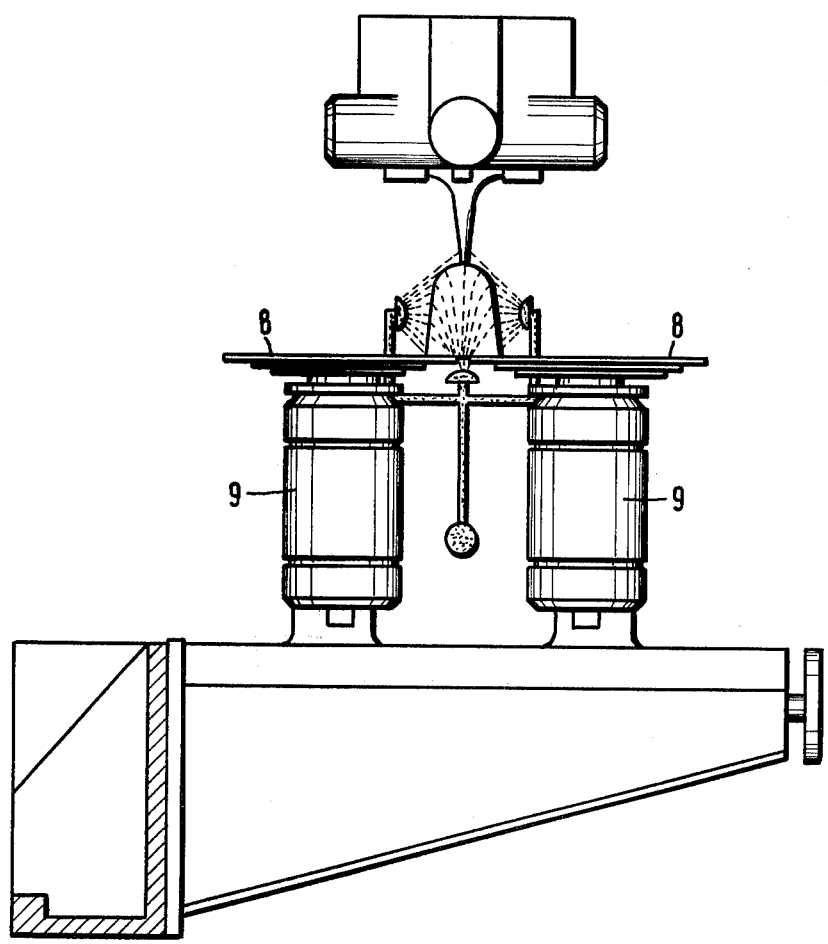
FIG. 5 is a side elevational view of a grinding station.

Following this treatment, the glasses are advance into a dual edge trimming station 123, 124; 125, 126, with the external edge trimming station (FIG. 4) including a diamond grinding wheel 6 which functions to grind the outer side of the edge. In this station, a plastic cone 7 acts as a hold-up element. The internal edge trimming station (FIG. 3) is of similar construction, the difference residing in the fact that the grinding wheel 6 engages the inner side of the edge of the glass with the hold-up element 7 being mounted on the outer side.

Figure 6:
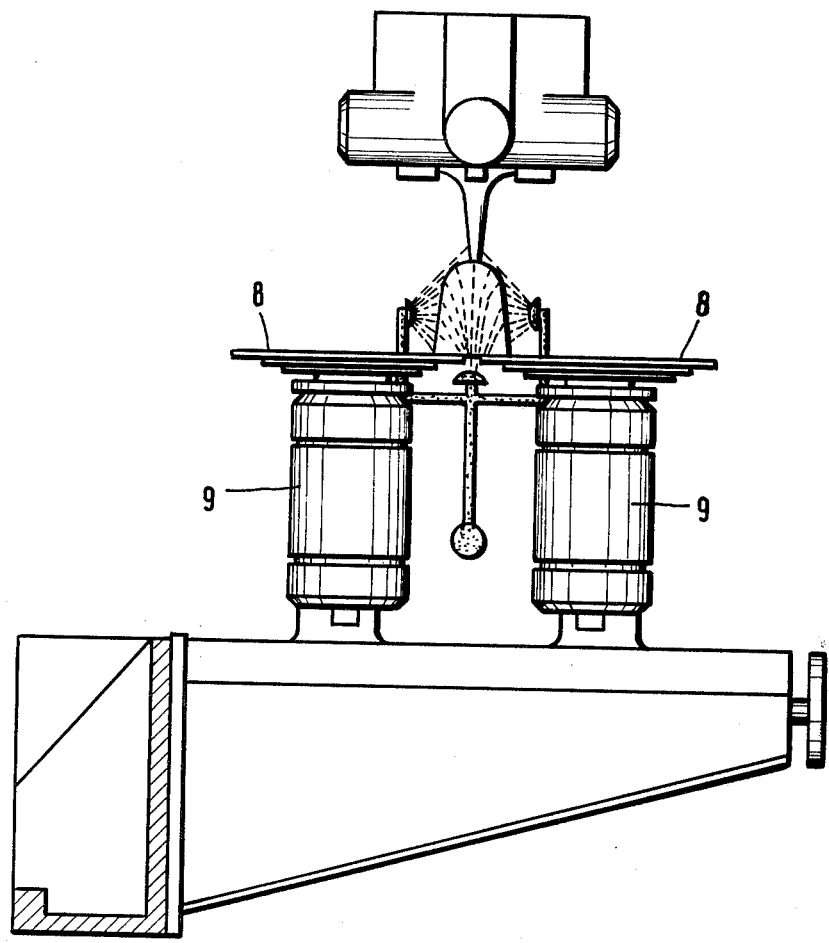
FIG. 6 is a side elevational view of the polishing station.

Following the edge trimming step, a polishing operation by means of flame may be performed; preferably, however, polishing wheels 10 at polishing station 131 or 132 are used in a plurality of polishing steps, which polishing wheels, same as the grinding wheels 8, (FIG. 6) are mounted directly to the shafts of the driving motors 11. The polishing wheels are made of sandstone; these wheels provide long service life while nevertheless being suitable to effect polishing of the edge of the glass so as to produce a completely transparent surface of the edge.

Figure 7:
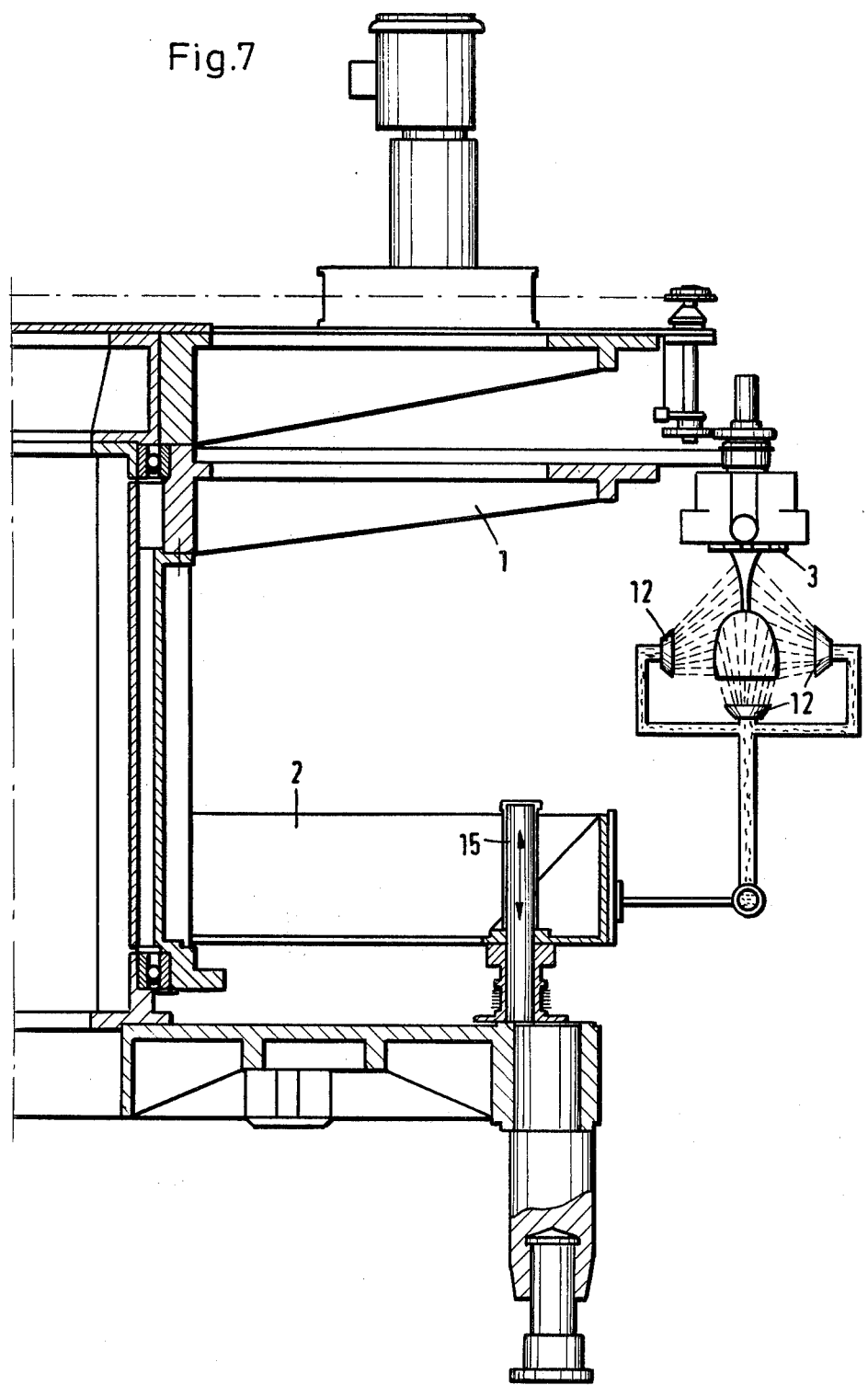
FIG. 7 is a schematical side elevational view of the washing station.
Figure 8:
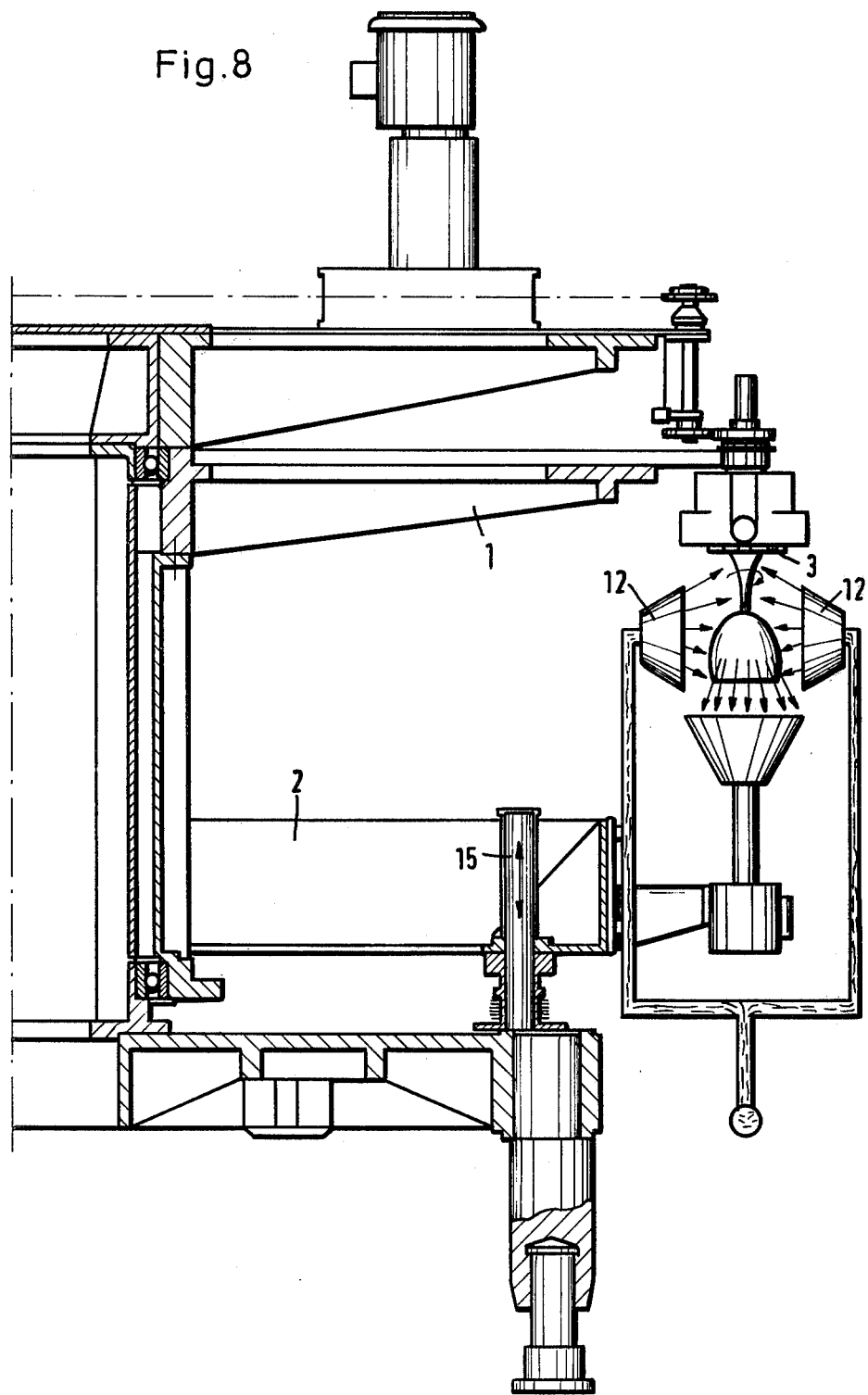
FIG. 8 shows the suck-off and blowing station.
Figure 9:
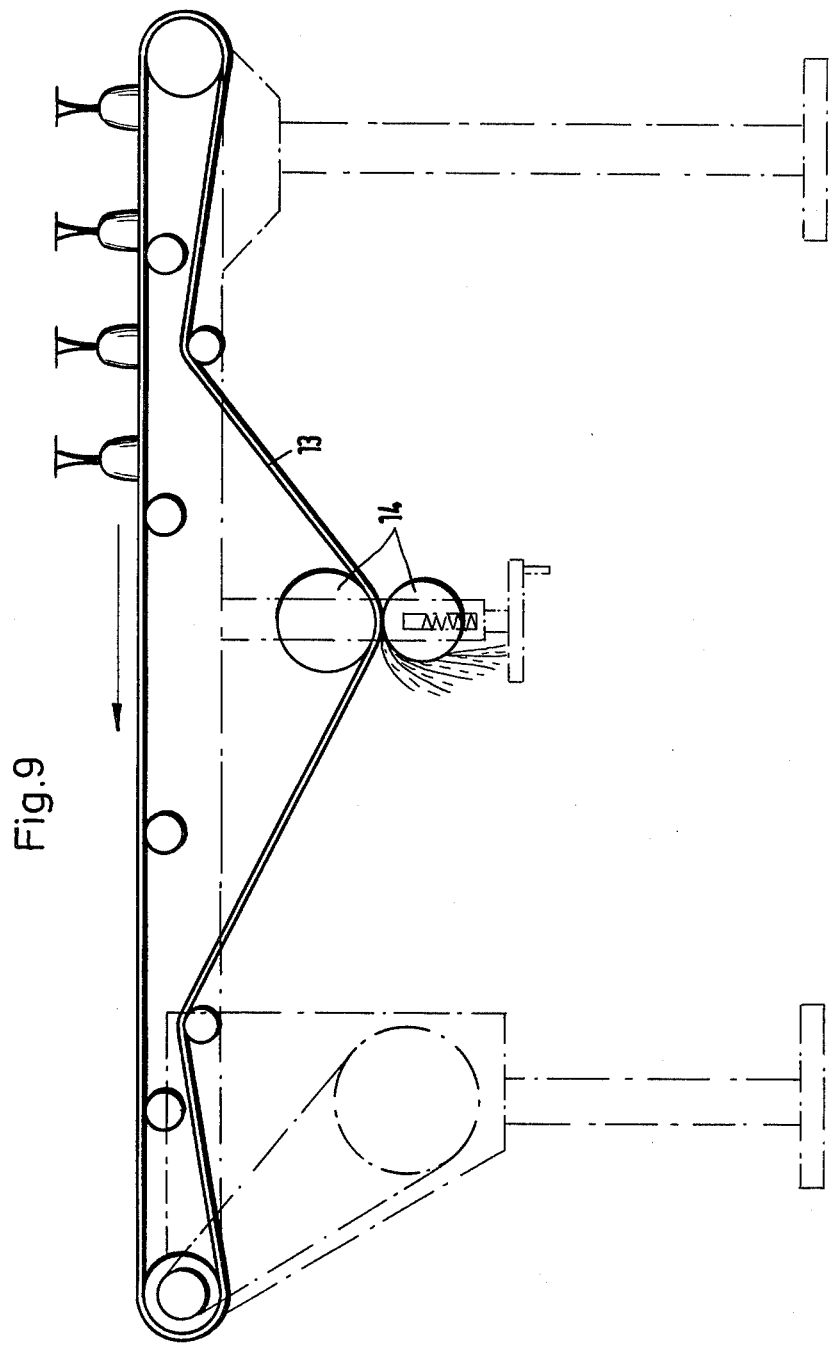
FIG. 9 shows the drying belt.

Still further, the glasses are washed at a station 133 or 134 in the machine by spray nozzles 12 (FIG. 7) for spraying a cleansing liquid, and the major part of the water is blown off (FIG. 8) with an air stream at a drying station 135 or 136. Thereafter, the glasses are transferred onto a drying belt at a station 137 or 138, and the glasses are subsequently removed from the automatic machine at the discharge station 138 or 140 and placed upon the endless belt 13 (FIG. 9) of a washing system including a drier 14 for the belt 13. Preferably the drier comprises a pair of squeezing rollers between which the belt passes and which act to squeeze out the cleansing liquid from the belt. The conveyor belt proper of the washing system is formed of highly absorbent material, e.g. of al felt known from paper production, which felt absorbs the drops gathering on the edge of the glass to thereby eliminate the need for manual drying.

The processing automaton according to the invention includes some further processing stations which are self-evident to the expert such that the description of these stations may be omitted. On the whole, an automatic machine of the disclosed type for the first time offers a technical solution to the object of performing the edge finishing in fully automatic manner and by providing a quality exceeding that of a manually finished edge of a glass.

What we claim is:

1. A method of automatically cracking-off edge portions from the remainder of hollow glass articles and for finish grinding an edge on the remainder of the glass articles comprising the steps of: scribing the articles with an annular cut to form a weakened area in the glass at a scribing station, moving the articles to a second station and heating and cracking off the scribed edge portion at a crack-off station, shifting the remainder of the glass article to a grind trimming station, grinding the internal and external sides of the glass edge at said grind trimming station, moving said glasses from said trimming station to said fine grinding station, find grinding of the edge to finish grind the edge at fine grinding station, and polishing the finished ground edge at a finish station to form a smooth finished edge on said glass articles.

2. A method in accordance with claim 1 including the further step of shifting the glass articles to a washing station and washing the same subsequent to the step of polishing of the finished ground edge.

3. A method in accordance with claim 2 including the step of drying of the previously washed glasses while conveying the same on a highly absorbent substrate.

4. A method in accordance with claim 1 including the step of suspending the glass articles which are in the form of cup-shaped glasses in an inverted position by their bases, and further comprising the moving of said suspended cups vertically relative to grinding tools to grind the bottom and open edges defining the lip for the glass.

5. A method in accordance with claim 4 in which said grinding steps include moving the grinding means upwardly into grinding engagement with the bottom lip of the glass and for lowering the grinding means from the glasses after having ground the lips.

6. A method in accordance with claim 1 in which said glass articles are moved and shifted between each of said stages automatically by a conveyor means.

7. A method in accordance with claim 6 in which said conveyor means comprises a turret means with each of said stations being located in a circumferential location thereon.

8. A method in accordance with claim 4 in which the polishing of the glass edge includes raising counter-rotating grinding means into engagement with the depending lower edge of the glass and grinding the glass to a predetermined height for said article.

9. An apparatus for automatically cracking-off edge portions from the remainder of hollow glass articles and for finish grinding an edge on the remainder of the glass articles, said apparatus comprising means for conveyor means for moving the articles automatically through each of a plurality of stations, means for scribing the articles with an annular cut to form a weakened area in the glass at a scribing station, means for heating and cracking off the scribed edge portion at a crack-off station, means for grinding the internal and external sides of the glass edge at a grind trimming station, means for fine grinding of the edge at a fine grinding station to finish the same, and means for polishing the ground edge at a polishing station to form a smooth finished edge on said glass articles.

10. An apparatus in accordance with claim 9 including means for washing the glasses at a washing station subsequent to the polishing of the ground edge.

11. An apparatus in accordance with claim 10 including means for drying the previously washed glasses while conveying the same on a highly absorbent substrate.

12. An apparatus in accordance with claim 9 in which said conveyor means includes means for suspending the glass articles which are in the form of cup-shaped glasses in an inverted position by their bases, and in which means moves said suspended cups vertically relative to the grinding means which grind the lower edges of the glasses.

13. An apparatus in accordance with claim 12 in which said moving means raises the grinding means upwardly into engagement with the lower depending edges of the glasses and lowers the grinding means from the glasses after having ground the same.

14. An apparatus in accordance with claim 9 in which said conveyor means includes a rotatable turret which turns automatically to shift each glass to and from said stations which are located on the periphery of said turret.